June 25, 1963  R. J. TREADWELL ETAL  3,095,168
ACTUATOR SYSTEMS FOR THE CONTROL SURFACES OF DIRIGIBLE CRAFT
Filed Sept. 20, 1960  4 Sheets-Sheet 1
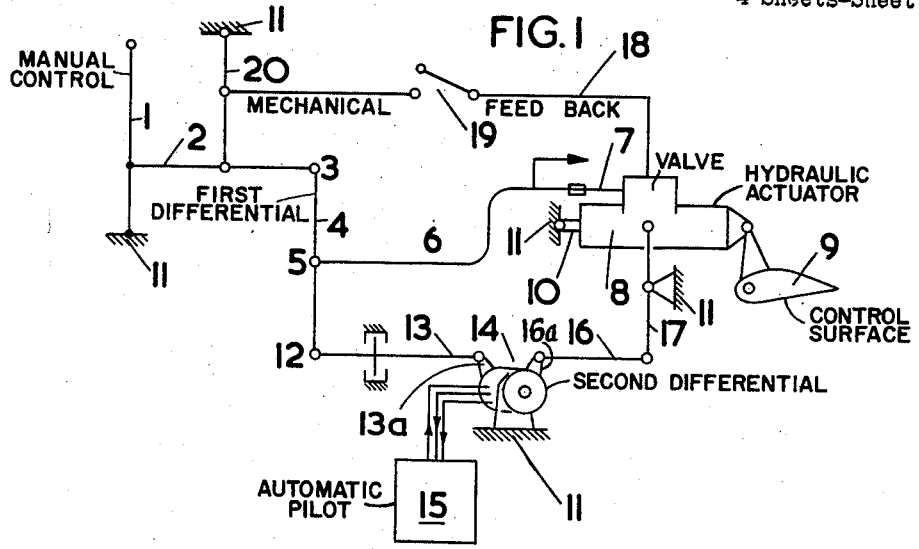
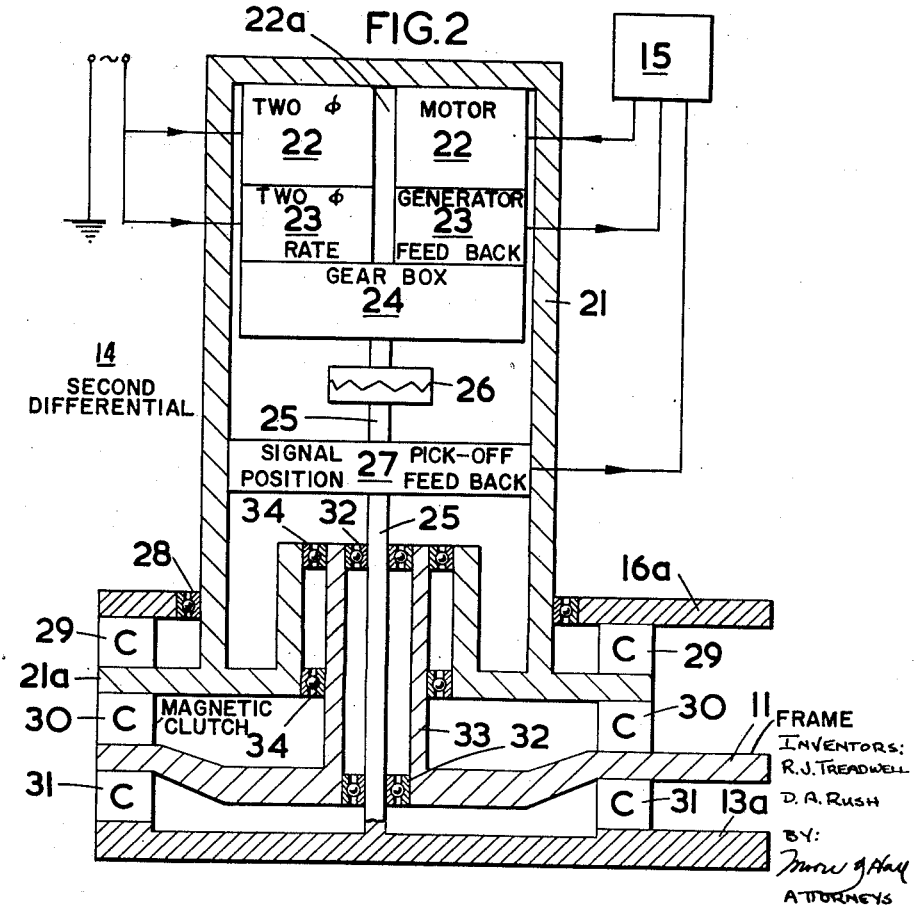
INVENTORS:
R. J. TREADWELL
D. A. RUSH
BY:
ATTORNEYS.

June 25, 1963   R. J. TREADWELL ETAL   3,095,168
ACTUATOR SYSTEMS FOR THE CONTROL SURFACES OF DIRIGIBLE CRAFT
Filed Sept. 20, 1960   4 Sheets-Sheet 2
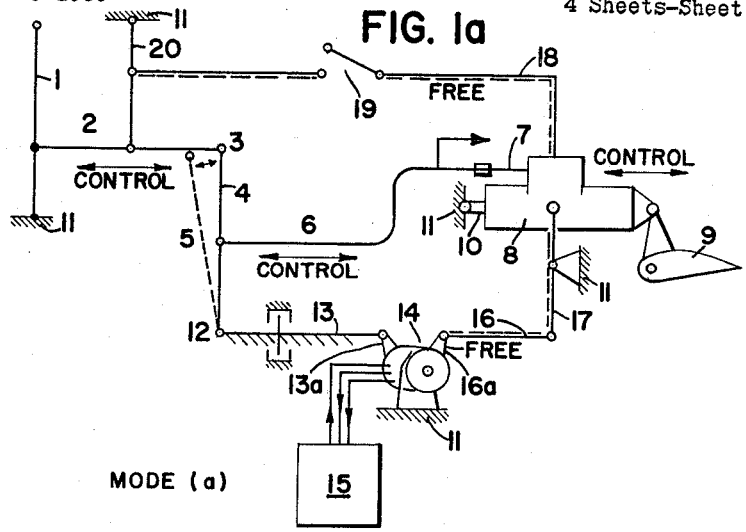
MODE (a)
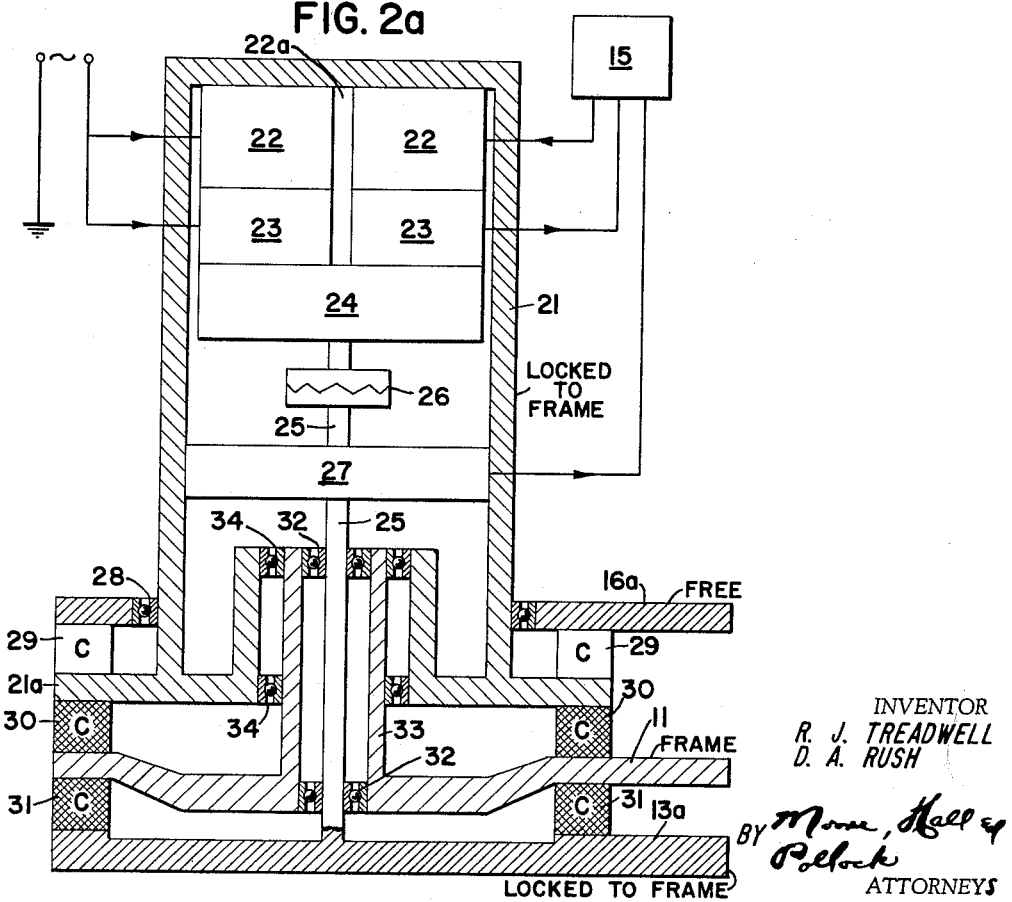
INVENTOR
R. J. TREADWELL
D. A. RUSH
BY Moore, Hall & Pollock
ATTORNEYS June 25, 1963 R. J. TREADWELL ETAL 3,095,168
ACTUATOR SYSTEMS FOR THE CONTROL SURFACES OF DIRIGIBLE CRAFT
Filed Sept. 20, 1960 4 Sheets-Sheet 3

MODE (b)

INVENTOR
R. J. TREADWELL
D. A. RUSH

BY Moore, Hall & Pollock
ATTORNEYS

June 25, 1963    R. J. TREADWELL ETAL    3,095,168
ACTUATOR SYSTEMS FOR THE CONTROL SURFACES OF DIRIGIBLE CRAFT
Filed Sept. 20, 1960    4 Sheets-Sheet 4
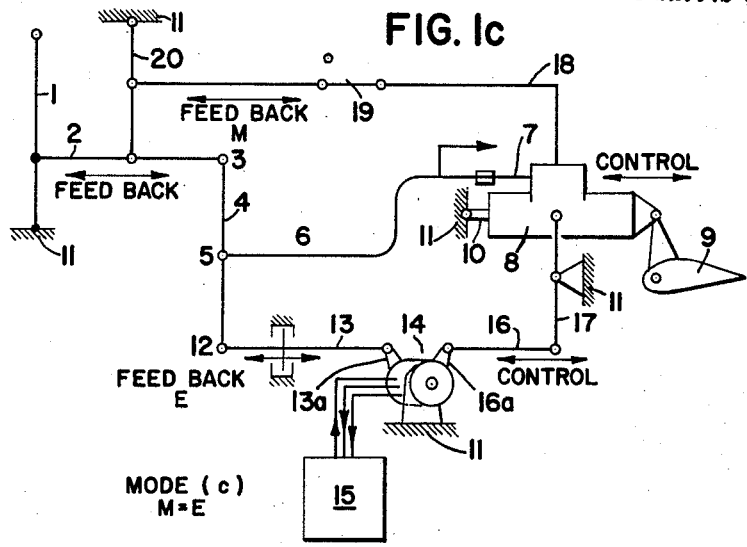
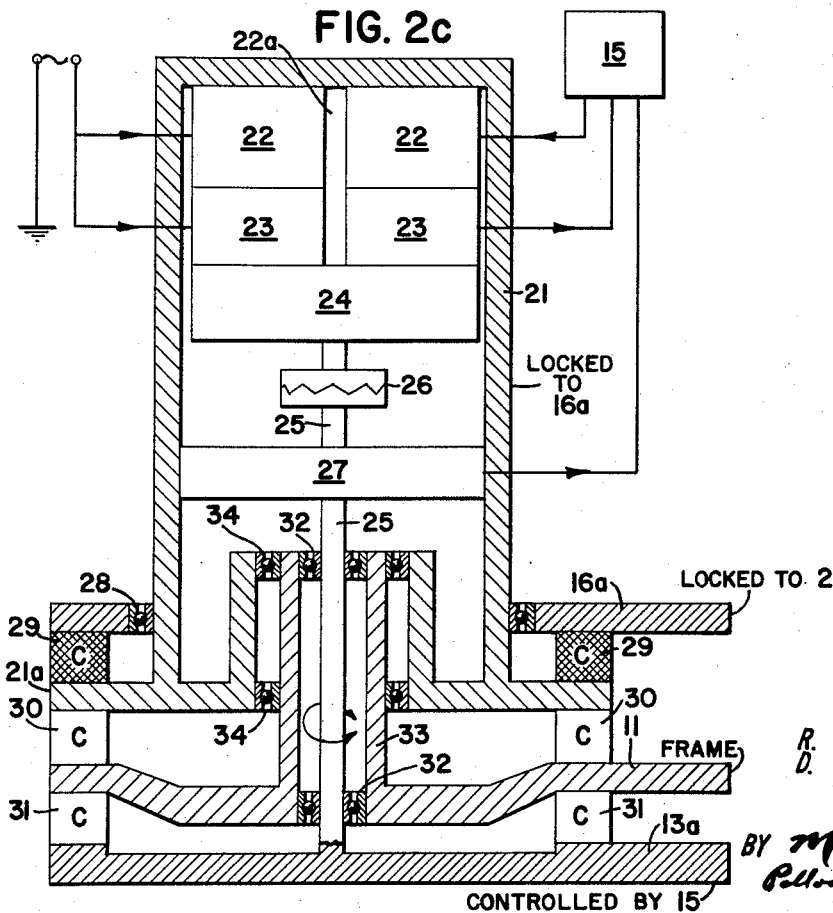
INVENTOR
R. J. TREADWELL
D. A. RUSH
ATTORNEYS United States Patent Office 3,095,168
Patented June 25, 1963

3,095,168
ACTUATOR SYSTEMS FOR THE CONTROL SURFACES OF DIRIGIBLE CRAFT
Richard Julian Treadwell, Gretton, Cheltenham, and Derek Anthony Rush, Stroud, England, assignors, by mesne assignments, to S. Smith & Sons (England) Ltd., London, England, a corporation of England
Filed Sept. 20, 1960, Ser. No. 57,231
Claims priority, application Great Britain Oct. 1, 1959
11 Claims. (Cl. 244—76)

The present invention relates to combined stabilization and steering systems for moving craft in general and for aircraft in particular.

It is an object of the invention to provide a combined steering and auto-stabilization device for aircraft for operation under (a) purely manual control, (b) manual control with stabilization damping control, or (c) purely automatic control.

It is an object of the invention to provide a combined steering and auto-stabilization device having automatic steering to which manual control or signals may be applied at any time.

It is an object of the invention to provide a three-mode steering device having a manual control member and an automatic pilot for positioning the control surfaces of an aircraft in which the position of the manual control member when the device is under automatic control corresponds to the instantaneous position of the aircraft control surface or surfaces under automatic control.

It is an object of the invention to provide a plural mode steering device having a manual lever and an automatic control in which the position of the manual lever indicates whether the automatic control is active.

It is an object of the invention to provide a mechanical feedback and an electrical feedback from the control surface actuator of an aircraft such that the feedbacks susbtantially cancel.

Reference is made to U.S. Patent No. 2,739,771 granted March 27, 1956, to F. W. Meredith for Stabilization and Steering Devices for Dirigible Craft, of which the present invention is an improvement, for additional background.

The device disclosed herein comprises an actuator control system for the control surfaces of dirigible craft, in particular but not exclusively of aircraft, of the kind (hereinafter referred to as "the kind specified") in which an actuator is required to position the control surface in accordance with (a) manual demands applied entirely by a human operator in controlling the craft manually (b) the sum of manual demands and auto-stabilisation demands from an automatic steering or stabilisation equipment for stabilising the motion of the craft whilst it is being steered manually (the auto-stabilisation demands being applied to damp out oscillatory motion of the craft, for example yawing oscillations of an aircraft) or (c) automatic steering demands applied entirely by an automatic steering (this is to be understood to include steering both in pitch and in azimuth in the case of an aircraft) equipment to control the craft automatically, the manual demands being applied by displacement of a manually operable member, hereinafter referred to as a "control member." The above patent provides a general discussion of the theory and operation on which the present improved structure is based. In such systems, the control member is often, particularly in aircraft, loaded by "artificial feel" devices.

It may be required that the position of the control member should indicate, when the craft is under automatic control, the position taken up by the control surface under the control of the automatic steering equipment. It has been proposed in the past to achieve this result by coupling a servo motor forming part of the automatic steering equipment directly to the conventional control run coupling the control member and an input to the actuator to impart the required automatic steering demands to the actuator. This has disadvantages, in that the servo motor has to supply sufficient power to move the control run, artificial feel device etc., rather than merely the relatively small amount of power required to position the actuator input. Also, the control run may introduce undesirable effects into the system if the servo motor is not coupled to it at a point closely adjacent to the actuator.

It is accordingly another object of the present invention to provide an actuator system for a control surface of a dirigible craft which is of the kind specified and which requires relatively low power outputs from the automatic steering equipment.

According to the present invention an actuator system of the kind specified for a control surface of a dirigible craft comprises an actuator, said actuator having a displaceable input member and an output member mechanically coupled to the control surface, the actuator displacing the control surface from a datum position thereof in dependence upon the displacement of the input member from a datum position thereof, a first differential having its output coupled to the input member of the actuator and one input coupled to the control member, a second differential having its output coupled to the second input of the first differential, first settable means settable either to couple a first input of the second differential to the output member of the actuator or to clamp it fixed, means for applying to a second input of the second differential a control surface displacement demand signal from an automatic steering or stabilising apparatus, second settable means settable either to clamp the output of the second differential, or to leave it free to be driven in dependence upon the signals applied to the inputs, and means engageable to establish a mechanical coupling between the actuator output member and the control member.

By "a differential" is meant a device which constrains three quantities, two inputs and an output, substantially to obey a linear relationship with constant coefficients.

In using an actuator system in accordance with the present invention in the three modes set out above:

(a) the control surface is actuated in accordance with manual demands alone when:
    (i) the output of the second differential is clamped and
    (ii) the mechanical coupling between the actuator output member and the control member is not engaged
(b) the control surface is actuated in accordance with the sum of manual and autostabilisation demands when:
    (i) the output of the second differential is unclamped,
    (ii) the first input to the second differential is clamped and
    (iii) the mechanical connection between the actuator output member and the control member is not engaged
(c) the control surface is actuated in accordance with automatic steering demands alone and the control member is positioned in accordance with control surface movements when:
    (i) the output of the second differential is unclamped,
    (ii) the first input to the second differential is coupled to the actuator output member and
    (iii) the mechanical coupling between the actuator member and the control member is engaged It will be appreciated that, in the third mode (c) above there are two feed-backs in opposite senses from the actuator output member to the input member, one through the mechanical coupling to the first input of the first differential and the other through the second differential and the second input of the first differential and that it is preferable that these feed-backs should substantially cancel, so that the relation between control member position and control surface position is the same in both modes (a) and (c) i.e. when the control surface is positioned by manual demands and automatic-steering demands.

An example of an actuator system according to the present invention will now be described with reference to the accompanying drawing in which:

FIGURE 1a is a schematic diagram of the actuator system showing mode (a) operation

FIGURE 1c is the schematic diagram of FIGURE 1a, showing mode (c) operation.

FIGURE 2a shows in fuller detail a device, indicated at 14 in FIGURE 1 showing mode (a) operation.

FIGURE 2c shows the device of FIGURE 2a in mode (c) operation.

The system to be described is designed for use in positioning a control surface of an aircraft, for example the elevator and it will be appreciated that a similar system may be provided for the other control surfaces e.g. the rudder or ailerons.

Figure 1B:
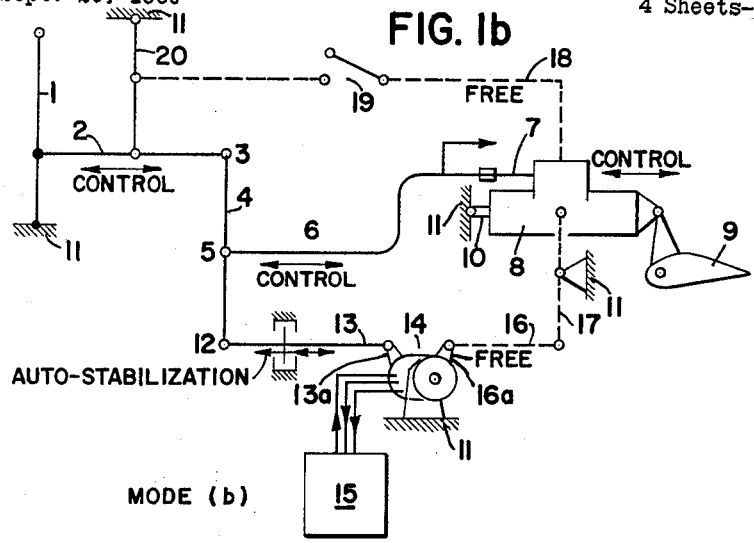
FIGURE 1b is the schematic diagram of FIGURE 1a, showing mode (b) operation.

Referring now to FIGURE 1, a conventional aircraft control column 1 is pivoted to the airframe 11, indicated diagrammatically at several places in FIGURE 1, and is connected to a conventional control run 2. The end of the control run 2 remote from the control column 1 is pivotally connected to one end 3 of a floating link 4. The mid-point 5 of floating link 4 is pivotally connected by a link 6, to the control valve 7 of a conventional moving body type hydraulic actuator 8. The moving body of the actuator 8 is connected to an aircraft control surface 9 in this case the elevator. The fixed piston 10 of the actuator 8 is connected to the airframe 11 in known manner. The actuator 8 acts in a known manner to position the control surface 9 in accordance with any displacement applied to the input valve 7 by the link 6, displacements of the link 6 from a datum position producing corresponding displacement of the control surface 9 from a datum position. The moving body of the actuator 8 is pivotally connected to a further link 17 of which the mid-point is pivotally connected to the airframe 11. The other end of the link 17 is pivotally connected to a link 16. Thus movement of the body of actuator 8 in one sense produces corresponding movement of the link 16 in the opposite sense. Link 16 is connected to one input member 16a of a device 14, which is shown diagrammatically but in greater detail in FIGURE 2. There is associated with the device 14 a connection to the air frame 11 and in addition the device 14 is coupled to an automatic pilot 15 to receive a control surface movement demand signal. The coupling also includes various feed-back connections for the autopilot 15 as described in greater detail below with reference to FIGURE 2. The output member 13a of the device 14 is connected to a link 13 which is connected pivotally at 12 to the end of link 4 remote from the pivotal connection 3.

The device 14 may be set to one of three conditions of operation in which respectively the point 12 is rigidly located, is moved in accordance with the sum of the control surface movement demand signal from the autopilot 15 and any movement of the body of the actuator 8, or is moved merely in accordance with the control surface movement demand signal from the auto-pilot 15.

The body of actuator 8 can be coupled through a link 18, and a two condition mechanical coupling which can be engaged or disengaged according to requirements 19 to the mid-point of a link 20, having one end pivotally connected to the air frame 11 and its other end pivotally connected to the control run 2. Link 18 and the coupling 19 provide the mechanical feedback channel referred to above.

Figure 2B:
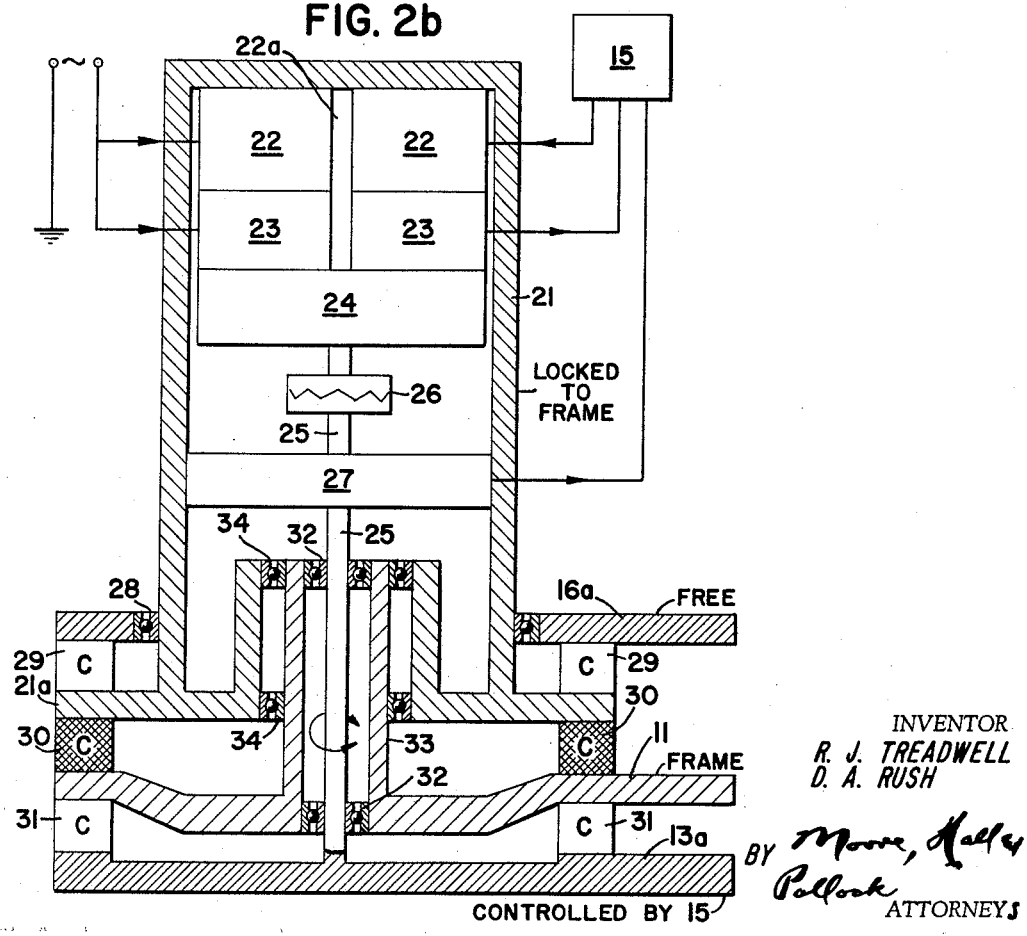
FIGURE 2b shows the device of FIGURE 2a in mode (b) operation.

Referring now to FIGURE 2, which shows a schematic representation of the device 14, it will be seen that it comprises a generally cylindrical housing 21, in which is disposed an electric motor 22, having a shaft 22a carrying a tachometric signal generator 23 and coupled through a gear box 24 and a slipping clutch 26 to an output shaft 25. An electrical signal pick-off 27 is associated with shaft 25 and housing 21, giving in operation an electric signal in accordance with the angular displacement of the shaft 25 with respect to housing 21 from some datum position. The construction of the motor 22, gear box 24 and electrical signal pick-off 27 may take the form shown in FIGURE 3 of U.S. Patent No. 2,620,463 granted December 2, 1952 to F. W. Meredith for Automatic Control System. Signal generator 23 is preferably wound for two phase operation, the input winding being connected to a suitable A.C. source which also supplies motor 22, so that a voltage proportional to the speed of generator 23 and therefore proportional to that of motor 22 and in quadrature with the A.C. source is developed and supplied as feedback to pilot 15. The construction of signal generator 23 is also discussed in the above Meredith patent. Shaft 25 is journalled by bearings 32 in a member 33 which solidly attached to the air frame as indicated by the reference 11, and as shown in FIGURE 1. The shaft 25 is itself integral with the output member 13 (see also FIGURE 1). The housing 21 is also rotatable with respect to air frame 11, being carried on bearings 34. The input member 16a (see also FIGURE 1) is rotatably located with respect to housing 21 by means of bearings 28. A clutch 31 is provided, by means of which the output member 13a (see also FIGURE 1) and hence the shaft 25 may be locked to the air frame 11. The clutch 31 may for example be an electromagnetically operated clutch which can be energized to lock the output member 13a to the air frame 11 but otherwise leaves the output member 13a free to rotate with respect to the air frame 11.

A further pair of clutches 29 and 30 is provided, by means of which a flange 21a on the housing 21 may be locked either to the air frame 11 on engagement of the clutch 30, or to the input member 16a on engagement of the clutch 29. The clutches 29 and 30 may for example be electromagnetic clutches which can be energized to effect the require engagement, their actuating circuits being interconnected so that only one can be energized at once. The motor 22, the generator 23 and the pick-off 27 are all connected to the auto pilot 15 in known matter, the latter actuating the motor 22 to cause rotation of the shaft 25 relative to the housing 21, in accordance with a demanded control surface movement signal generated within the auto pilot 15. The generator 23 and pick-off 27 provide rate and position feedback signals for the auto pilot in known manner and it will be understood that either of these may be omitted depending on the design of the auto pilot 15.

It will be appreciated that the link 4 constitutes the first differential referred to in the claims of this specification and that the second differential is incorporated in the device 14.

The operation of the device is as follows:

(a) For the manual mode of operation, the clutch 31 locks the member 13a to the air frame 11, the clutch 30 locks the housing 21 to the air frame 11, and the mechanical coupling 19 is disengaged. Then the movements of input valve 7 of the actuator 8 and hence the movements of the control surface 9, will correspond to the movements applied to the control column 1 by the human pilot, since the column 1 is coupled to the input valve 7. The feed-back through the link 18 is ineffective since the coupling 19 is disengaged, as also is that through the link 16 as the input member 16a is free to rotate with respect to the housing 21 of the device 14, clutch 29 being disengaged. In addition, the output member 13a is locked to the frame 11 and link 4 pivots about point 12 which is now fixed.

(b) For the auto-stabilisation mode, the clutch 31 is disengaged and the clutch 30 is engaged to lock the housing 21 to the air frame 11. The clutch 29 remains disengaged as does the coupling 19. Then, the movements of valve 7 correspond to the sum of the manual demands applied by the human pilot to the control column 1 and auto-stabilisation demands applied by the automatic pilot 15 which in this mode will operate only to stabilise the aircraft's motion and will not have manoeuvre demand signals applied to it. The summation is effected by the first differential, i.e., the link 4, which is driven both by the control run 2 and the output link 13 from the device 14. In the latter the output member 13a is free to be driven by the auto-pilot 15 through shaft 22a, clutch 26 and shaft 25 which is integral with output member 13a. However, it will be noted that no component of movement of the run 2 is produced by the demands of auto-pilot 15.

(c) For the fully automatic mode, the housing 21 of device 14 is locked to the input member 16a by energisation of clutch 29, clutches 30 and 31 being disengaged and the coupling 19 engaged. The housing 21 is thus itself positioned in accordance with the actual control surface movements by virtue of its coupling, to the actuator 8 through the links 17 and 16. Thus these movements and movements representing the automatic steering demands from the auto-pilot 15 which are summed in the device 14 which in this condition acts as a differential (the second differential), are together applied to the link 4 by the link 13. As the coupling 19 is engaged any movement of the control surface 9 is accompanied by corresponding movements of the control run 2 and thus of the control column 1 as required. These control run movements are of course also applied to the link 4 but are in fact cancelled out by the corresponding movements applied to the link 4 from the device 14 via link 13 so that the movements of the link 6 represent only the automatic steering demands. It will be appreciated that for this purpose the movement that would be imparted to the link 6 in response to a given movement of the actuator 8 either through links 18 and 20 alone or through link 17, device 14 and link 13 alone, must in all circumstances in this mode be equal and opposite, so that in fact they cancel and the link 6 is moved only in accordance with the automatic steering demands. Thus, the control run 2 is moved in accordance with the actual movements of the control surface 9 which is itself moved in accordance with the automatic steering demands arising from the auto-pilot 15.

It will be appreciated that if a moving ram rather than a moving body type of actuator were used, the link 6, instead of being connected directly to the valve 7, would be connected to one input of a differential of which the other input would be connected to the ram and the output to the valve to position it as required.

While there have been described above what are believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. An actuator system for a control surface of a dirigible craft, the system comprising an actuator having an input member which has a datum position from which it can be displaced and an output member for mechanically coupling the actuator to a control surface to be positioned by the actuator, the output member having a datum position corresponding to a datum position of the control surface and being displaced from said datum position in dependence upon any displacement of the input member from its datum position; a manual control member for applying manual demands to the actuator system; a first differential having first and second inputs and an output, its output being coupled to the input member of the actuator and its first input being coupled to the manual control member; a second differential having an output and first and second inputs, its output being coupled to the second input of the first differential; a first drive from the output member of the actuator; first settable means settable to either of first and second conditions of operation in the first of which it couples the first input of the second differential to said first drive and in the second of which it clamps the first input of the second differential fixed; a source of automatic stabilising and steering signals; means for applying said stabilising and steering signals to the second input of the second differential; second settable means having two conditions of operation in the first of which it clamps the output of the second differential fixed and in the second of which it leaves the output free to be driven in dependence upon the signals applied to the inputs of the second differential; a second drive from the output member of the actuator; and means engageable to establish a coupling between the second drive and the manual control member.

2. An actuator system according to claim 1 in which the actuator is a moving body type hydraulic actuator having a body forming the output member and mounted for movement relative to a ram which is adapted to be fixed to the craft, and an input member in the form of a valve mounted on the body and positionable to control the application of fluid pressure to the ram.

3. An actuator system according to claim 1 in which the actuator is a moving ram type hydraulic actuator having a body adapted to be fixed to the craft, a ram forming the output member and mounted for movement relative to the body in response to the application of fluid pressure and an input member in the form of a valve mounted on the body and positionable to control the application of fluid pressure to the ram, the system further including a third differential interposed between the first differential and the input member of the actuator and having an output and first and second inputs, the output being coupled to the actuator input member, its first input being coupled to the output of the first differential and its second input to the ram.

4. An actuator system according to claim 1 in which the second differential comprises a housing adapted to be mounted for rotation relative to the frame of the craft, the housing or framework carrying an electric motor having an output shaft, which is the output of the second differential, and which is mounted to be rotated by the motor relative to the housing in acordance with electric signals applied to the motor.

5. An actuator system according to claim 4 in which the second settable means includes a clutch mechanism having two conditions of operation in the first of which the output shaft of the motor is clamped still relative to the frame of the craft and in the second of which the output shaft is left free to rotate relative to the frame of the craft.

6. An actuator system according to claim 4 in which the motor is a servo motor which is coupled to said source of stabilising and steering signals to be driven thereby in dependence under the control of the signals, and the output shaft carries at least one feed-back signal generator for said source.

7. An actuator system according to claim 4 in which the first settable means is a clutch mechanism having first and second conditions of operation in the first of which it couples the housing to said first drive from the actuator output member to be rotated relative to the craft frame in accordance with the movements of the output member and in the second of which it clamps the housing still relative to the craft frame.

8. An actuator system according to claim 7 in which the second settable means includes a clutch mechanism having two conditions of operation in the first of which the output shaft of the motor is clamped still relative to the frame of the craft and in the second of which the output shaft is left free to rotate relative to the frame of the craft.

9. In combination, a dirigible craft having a control surface for controlling the motion of said craft about a predetermined axis, apparatus for generating signals for automatically steering and stabilising said craft about said axis, a manual control member for applying manual demand signals to said control surface and an actuator system for said control surface having an input member which has a datum position from which it can be displaced and an output member for mechanically coupling the actuator to a control surface to be positioned by the actuator, the output member having a datum position corresponding to a datum position of the control surface and being displaced from said datum position in dependence upon any displacement of the input member from its datum position; a manual control member for applying manual demands to the actuator system; a first differential having first and second inputs and an output, its output being coupled to the input member of the actuator and its first input being coupled to the manual control member; a second differential having an output and first and second inputs, its output being coupled to the second input of the first differential; a first drive from the output member of the actuator; first settable means settable to either of first and second conditions of operation in the first of which it couples the first input of the second differential to said first drive and in the second of which it clamps the first input of the second differential fixed; a source of automatic stabilizing and steering signals; means for applying said stabilizing and steering signals to the second input of the second differential; second settable means having two conditions of operation in the first of which it clamps the output of the second differential fixed and in the second of which it leaves the output free to be driven in dependence upon the signals applied to the inputs of the second differential; a second drive from the output member of the actuator; and means engageable to establish a coupling between the second drive and the manual control member.

10. The combination according to claim 9 in which the craft is an aircraft, and the signal generating apparatus is an automatic pilot.

11. A system for the controlled actuation of a control surface of an aircraft, having a plurality of modes of operation, manual input means, aircraft control, surface and actuator means, a first differential means connecting said actuator means and said manual input means, automatic pilot means, a second differential means connecting said automatic pilot means, said actuator means and said first differential means in such manner that action of said first differential means is limited for at least one mode of operation of said system whereby the system is subject only to manual control, multiple-channel feedback means connecting said actuator means and said manual input means whereby said system provides at least three modes of operation, one mode of operation being entirely manual, one mode of operation being entirely automatic and one mode of operation being combined manual and auto-stabilization, said feedback means connecting said manual input means and said actuator means being operable only for the completely automatic mode and acting to position said manual input means whereby indication is given as to the instantaneous position of the aircraft control surface being controlled and that the automatic pilot means is functioning.

References Cited in the file of this patent
UNITED STATES PATENTS

| | | |
|---|---|---|
| 2,451,263 | Webb | Oct. 12, 1948 |
| 2,678,177 | Chenery et al. | May 11, 1954 |
| 2,739,771 | Meredith | Mar. 27, 1957 |
| 2,961,203 | Hutchinson et al. | Nov. 22, 1960 |